United States Patent
Kwok et al.

(10) Patent No.: US 12,113,929 B2
(45) Date of Patent: Oct. 8, 2024

(54) SYSTEMS AND METHODS FOR DETECTING AND/OR PREVENTING VISHING ATTACKS USING USER-GENERATED AUTHENTICATION INFORMATION

(71) Applicant: Capital One Services, LLC, McLean, VA (US)

(72) Inventors: Jennifer Kwok, Brooklyn, NY (US); Dwij Trivedi, Oakton, VA (US); Abhay Donthi, Arlington, VA (US); Leeyat Bracha Tessler, Arlington, VA (US); Salik Shah, Bethesda, MD (US)

(73) Assignee: Capital One Services, LLC, McLean, VA (US)

( * ) Notice: Subject to any disclaimer, the term of this patent is extended or adjusted under 35 U.S.C. 154(b) by 359 days.

(21) Appl. No.: 17/661,776

(22) Filed: May 3, 2022

(65) Prior Publication Data

US 2023/0362298 A1    Nov. 9, 2023

(51) Int. Cl.
*H04W 12/06*     (2021.01)
*H04M 3/38*      (2006.01)
(Continued)

(52) U.S. Cl.
CPC ....... *H04M 3/382* (2013.01); *H04M 3/42034* (2013.01); *H04M 2203/60* (2013.01)

(58) Field of Classification Search
CPC ............ H04M 3/382; H04M 3/42034; H04M 2203/60
See application file for complete search history.

(56) References Cited

U.S. PATENT DOCUMENTS 6,807,256 B1    10/2004    Holt et al.
7,027,569 B2     4/2006    Price
(Continued)

FOREIGN PATENT DOCUMENTS

EP      1770973 A1      4/2007
WO   2008082489 A1      7/2008

OTHER PUBLICATIONS

WikipediA "Voice phishing" https://en.wikipedia.org/wiki/Voice_phishing, Apr. 25, 2022, (10 pages).

*Primary Examiner* — Moustapha Diaby
(74) *Attorney, Agent, or Firm* — Bookoff McAndrews, PLLC

(57) ABSTRACT

A computer-implemented method for authenticating a source of a telephone call to a recipient of the telephone call may include receiving, prior to receiving the telephone call, a request to input first authentication information. The first authentication information may include a passcode or a selection of a security question. The method may include receiving input of the first authentication information and sending, by the user device, the first authentication information to a computing device associated with the source of the telephone call. The method may include receiving the telephone call from the source and receiving input from the recipient of the telephone call to answer the telephone call. The method may include receiving second authentication information from the computing device, where the second authentication information may include the passcode or an answer to the security question. The method may include outputting the second authentication information.

20 Claims, 11 Drawing Sheets

(51) Int. Cl.
  *H04M 3/42*    (2006.01)
  *H04W 12/08*   (2021.01)
  *H04W 12/12*   (2021.01)
  *H04W 88/02*   (2009.01)

(56)  References Cited

U.S. PATENT DOCUMENTS

| | | |
|---|---|---|
| 7,212,620 B1 | 5/2007 | Mastro |
| 8,812,319 B2 | 8/2014 | Skerpac |
| 2011/0211682 A1 | 9/2011 | Singh et al. |
| 2015/0229631 A1 | 8/2015 | Pillay |
| 2018/0205822 A1* | 7/2018 | Gupta .................. H04M 3/382 |
| 2021/0044696 A1* | 2/2021 | Gray .................... H04W 12/06 |

* cited by examiner

SYSTEMS AND METHODS FOR DETECTING AND/OR PREVENTING VISHING ATTACKS USING USER-GENERATED AUTHENTICATION INFORMATION

TECHNICAL FIELD

Various embodiments of this disclosure relate generally to techniques for preventing vishing and, more particularly, to systems and methods for detecting and/or preventing vishing attacks using user-generated authentication information.

BACKGROUND

Voice phishing, also referred to as vishing, involves using a telephone to conduct phishing attacks. For example, a malicious actor may make a telephone call to an individual claiming to be the individual's bank, credit card company, insurance company, etc. for the purposes of eliciting personal or sensitive information from the individual, such as account identifiers, security information, and/or the like. These types of attacks often are conducted using automated text-to-speech systems. Some techniques for detecting vishing attacks include using artificial intelligence (AI) or machine learning (ML) to detect differences between legitimate calls and vishing attacks. However, as vishing attacks become more sophisticated, this technique may not be able to detect vishing attacks with a sufficient level of accuracy and may be limited by the training set used for AI/ML models. Other techniques for detecting or preventing vishing attacks include usage of blocklists (also known as denylists) for known malicious actors and training individuals to recognize common traits of vishing attacks. Usage of a blocklist is significantly limited by the completeness of the blocklist and training individuals to recognize blocklists is entirely dependent on humans to make accurate judgments regarding the authenticity of an incoming call. Thus, conventional techniques, including the foregoing, fail to provide a technical solution to detecting and/or preventing vishing attacks with a high-level of security.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for detecting and/or preventing vishing attacks using user-generated authentication information.

A computer-implemented method for authenticating a source of a telephone call to a recipient of the telephone call may include receiving, by a user device associated with the recipient of the telephone call and prior to receiving the telephone call, a request to input first authentication information. The first authentication information may include a passcode or a selection of a security question. The method may include receiving, by the user device, input of the first authentication information and sending, by the user device, the first authentication information to a computing device associated with the source of the telephone call. The method may include receiving, by the user device, the telephone call from the source and receiving, by the user device, input from the recipient of the telephone call to answer the telephone call. The method may include receiving, by the user device, second authentication information from the computing device, where the second authentication information may include the passcode or an answer to the security question. The method may include outputting, by the user device, the second authentication information.

A user device may include at least one memory storing instructions and at least one processor executing the instructions to perform operations for authenticating a source of a telephone call to a recipient of the telephone call. The operations may include receiving, prior to receiving the telephone call, a request to input first authentication information. The first authentication information may include a passcode or a selection of a security question. The operations may include receiving input of the first authentication information and sending the first authentication information to a computing device associated with the source of the telephone call. The method may include receiving the telephone call from the source and receiving input from the recipient of the telephone call to answer the telephone call. The method may include receiving second authentication information from the computing device, where the second authentication information may include the passcode or an answer to the security question. The method may include outputting, by the user device, the second authentication information.

A non-transitory computer-readable medium may store instructions that, when executed by a processor, may cause the processor to perform a method for authenticating a source of a telephone call to a recipient of the telephone call. The method may include receiving, prior to receiving the telephone call, a request to input first authentication information, where the first authentication information may include a passcode or a selection of a security question. The method may include receiving input of the first authentication information and sending the first authentication information to a computing device associated with the source of the telephone call. The method may include receiving the telephone call from the source and receiving input from the recipient of the telephone call to answer the telephone call. The method may include receiving second authentication information from the computing device, where the second authentication information may include the passcode or an answer to the security question. The method may include outputting the second authentication information.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
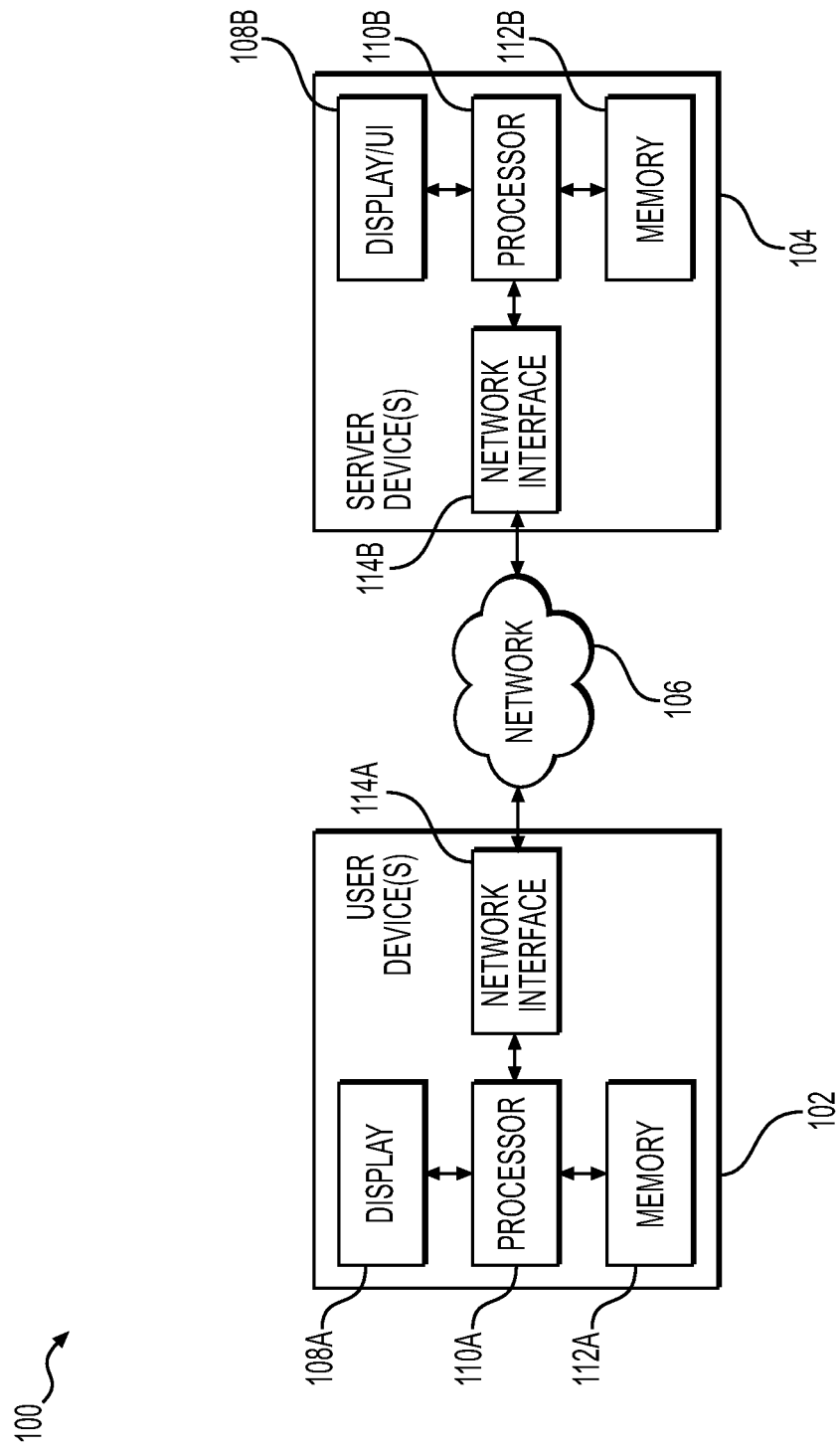
FIG. 1 depicts an exemplary environment for using user-generated authentication information to detect and/or prevent vishing attacks, according to one or more embodiments.

According to certain aspects of the disclosure, methods and systems are disclosed for detecting and/or preventing vishing attacks, e.g., using user-generated authentication information. Conventional techniques include using AI/ML models to detect vishing calls, using manually-created blocklists, or relying on the judgement of humans to detect vishing telephone calls. However, conventional techniques may not be suitable. For example, conventional techniques may not be able to detect vishing calls with a sufficient level of accuracy because they rely significantly on having complete information (e.g., in the form of a blocklist or an AI/ML training data set) for the detection. Accordingly, improvements in technology relating to detecting vishing calls and/or preventing vishing attacks are needed.

As will be discussed in more detail below, in various embodiments, systems and methods are described for using user-generated authentication information for detecting vishing calls and thereby preventing vishing attacks. Some embodiments may utilize AI/ML models to determine the specific type of authentication information to be generated by a user based on, e.g., the nature of a telephone call, the source of the telephone call, and/or the like. By training a machine-learning model, e.g., via supervised or semi-supervised learning, to learn associations between telephone call-related data and corresponding security levels for telephone calls, the trained machine-learning model may be usable to generate requests for particular types of user-generated authentication information based on the security levels.

Reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser extension" may be used interchangeably with other terms like "program," "electronic application," or the like, and generally encompasses software that is configured to interact with, modify, override, supplement, or operate in conjunction with other software. As used herein, terms such as "application" or the like generally encompass computer program installed on a user device, such as a smartphone, designed to perform certain tasks or provide access to certain services. For example, a user may have a banking application installed on their smartphone interacting with their bank to, e.g., view an account balance, apply for financial services (e.g., a loan, a credit card, etc.), communicate with their bank via a messaging system, and/or the like.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, certain embodiments may use one or more trained machine learning models to classify a user, a telephone call, a source of the telephone call, and/or the like into a security level. Certain embodiments may, based on the classification, determine a type of authentication information to be generated by a user for authenticating a telephone call. In another exemplary use case, certain embodiments may use one or more trained machine learning models to predict a preferred type of authentication information for a user so as to request the preferred type from the user.

While several of the examples above involve classifying a telephone call or a user, it should be understood that techniques according to this disclosure may be adapted to any suitable type of communication (e.g., telephone call, email, text message, push notification, etc.) or entity (e.g., individual, company, governmental entity, etc.). It should also be understood that the examples above are illustrative only. The techniques and technologies of this disclosure may be adapted to any suitable activity.

Presented below are various aspects of certain embodiments, including machine learning techniques, that may be adapted to detect and/or prevent vishing attacks. As will be discussed in more detail below, machine learning techniques adapted to classifying telephone calls or users, may include one or more aspects according to this disclosure, e.g., a particular selection of training data, a particular training process for the machine-learning model, operation of a particular device suitable for use with the trained machine-learning model, operation of the machine-learning model in conjunction with particular data, modification of such particular data by the machine-learning model, etc., and/or other aspects that may be apparent to one of ordinary skill in the art based on this disclosure.

FIG. 1 depicts an exemplary environment 100 that may be utilized with techniques presented herein. The environment 100 may include one or more user devices 102, one or more server devices 104, and a network 106. Although FIG. 1 depicts a single user device 102, server device 104, and network 106, the embodiments described herein are applicable to environments 100 that include two or more user devices 102, server devices 104, and/or networks 106 in any suitable arrangement.

The user device 102 may include a display 108A, a processor 110A, a memory 112A, and/or a network interface 114A. The user device 102 may be a mobile device, such as a smartphone, a cell phone, a tablet, a laptop computer, etc., a desktop computer, and/or the like. The user device 102 may execute, by the processor 110A, one or more instructions stored in the memory 112A to, e.g., generate (or request input of) authentication information for detecting and/or preventing vishing calls, or train and/or use one or more machine learning models to classify a telephone call or a user, as described elsewhere herein. One or more components of the user device 102 may generate, or may cause to be generated, one or more graphic user interfaces (GUIs) based on instructions/information stored in the memory 112A, instructions/information received from the server device 104, and/or the like and may cause the GUIs to be displayed via the display 108A. The GUIs may be, e.g., mobile application interfaces or browser user interfaces and may include text, input text boxes, selection controls, and/or the like. The display 108A may include a touch screen or a display with other input systems (e.g., a mouse, keyboard, etc.) for an operator of the user device 102 to control the functions of the user device 102. The network interface 114A may be a transmission control protocol/Internet protocol (TCP/IP) network interface, or another type of wired or wireless communication interface, for Ethernet or wireless communications with the server device 104 via the network 106.

The server device 104 may include a display 108B, a processor 110B, a memory 112B, and/or a network interface 114B. The server device 104 may be a computer, system of computers (e.g., rack server(s)), or a cloud service computer system (e.g., in a data center). The server device 104 may execute, by the processor 110B, one or more instructions stored in the memory 112B to, e.g., generate (or request input of) authentication information for preventing vishing calls, or train and/or use one or more machine learning models to classify one or more telephone calls or a user, as described elsewhere herein. One or more components of the server device 104 may generate, or may cause to be generated, one or more graphic user interfaces (GUIs) based on instructions/information stored in the memory 112B, instructions/information received from the user device 102, and/or the like and may cause the GUIs to be displayed via the display 108B.

The network 106 may include one or more wired and/or wireless networks, such as the Internet, an intranet, a wide area network ("WAN"), a local area network ("LAN"), personal area network ("PAN"), a cellular network (e.g., a 3G network, a 4G network, a 5G network, etc.) or the like. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "webpage" generally encompasses a location, data store, or the like that is, e.g., hosted and/or operated by a computer system so as to be accessible online, and that may include data configured to cause a program such as a web browser to perform operations such as send, receive, or process data, generate a visual display and/or an interactive interface, or the like. The user device 102 and the server device 104 may be connected via the network 106, using one or more standard communication protocols. The user device 102 and the server device 104 may transmit and receive messages from each other across the network 106, as discussed in more detail below.

As discussed in further detail below, the one or more components of exemplary environment 100 may generate, request, or receive authentication information from a user of the user device 102. Additionally, or alternatively, and as discussed in further detail below, the one or more components of exemplary environment 100 may generate, store, train and/or use a machine-learning model for determining a type of authentication information for a telephone call. The exemplary environment 100 or one of its components may include or be in operable communication with a machine-learning model and/or instructions associated with the machine-learning model, e.g., instructions for generating a machine-learning model, training the machine-learning model, using the machine-learning model, etc. The exemplary environment 100 or one of its components may include instructions for retrieving data, adjusting data, e.g., based on the output of the machine-learning model, and/or operating a display to output data, e.g., as adjusted based on the machine-learning model. The exemplary environment 100 or one of its components may include, provide, obtain, and/or generate training data.

In some embodiments, a system or device other than the components shown in the exemplary environment 100 may be used to generate and/or train the machine-learning model. For example, such a system may include instructions for generating and/or obtaining the machine-learning model, the training data and ground truth, and/or instructions for training the machine-learning model. A resulting trained-machine-learning model may then be provided to the exemplary environment 100 or one of its components and, for example, stored in the memory 112A and/or 112B.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable. Certain embodiments may utilize, for training a machine learning model, unsupervised learning where, e.g., the sample of training data may not include pre-assigned labels or scores to aid the learning process or may utilize semi-supervised learning where a combination of training data with pre-assigned labels or scores and training data without pre-assigned labels or scores is used to train a machine learning model.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., may be used to compare the output of the trained model with the ground truth for that portion of the training data to evaluate an accuracy of the trained model. The training of the machine-learning model may be configured to cause the machine-learning model to learn associations between training data (e.g., secure user data) and ground truth data, such that the trained machine-learning model is configured to determine an output in response to the input data based on the learned associations.

In various embodiments, the variables of a machine-learning model may be interrelated in any suitable arrangement in order to generate the output. For example, in some embodiments, the machine-learning model may include an architecture that is configured classify a telephone call into a security level based on a subject matter of the telephone call or a source of the telephone call, or to classify a user into a security level based on user preferences or past actions of the user. For example, the machine-learning model may include one or more neural networks configured to identify features in the data, and may include further architecture, e.g., a connected layer, neural network, etc., configured to determine a relationship between the identified features in order to determine a location in the data. In certain embodiments, the machine learning model may include a single node for classification, as described elsewhere herein.

Although depicted as separate components in FIG. 1, it should be understood that a component or portion of a component in the exemplary environment 100 may, in some embodiments, be integrated with or incorporated into one or more other components. For example, a portion of the display 108A may be integrated into the user device 102 or the like. In another example, the server device 104 may be integrated in a data storage system. In some embodiments, operations or aspects of one or more of the components discussed above may be distributed amongst one or more other components. Any suitable arrangement and/or integration of the various systems and devices of the exemplary environment 100 may be used.

Further aspects of using user-generated authentication information for detecting and/or preventing vishing calls or of the machine-learning model and/or how it may be trained or used to classify a telephone call or a user are discussed in further detail below. In the following disclosure, various acts may be described as performed or executed by a component from FIG. 1, such as the user device 102, the server device 104, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
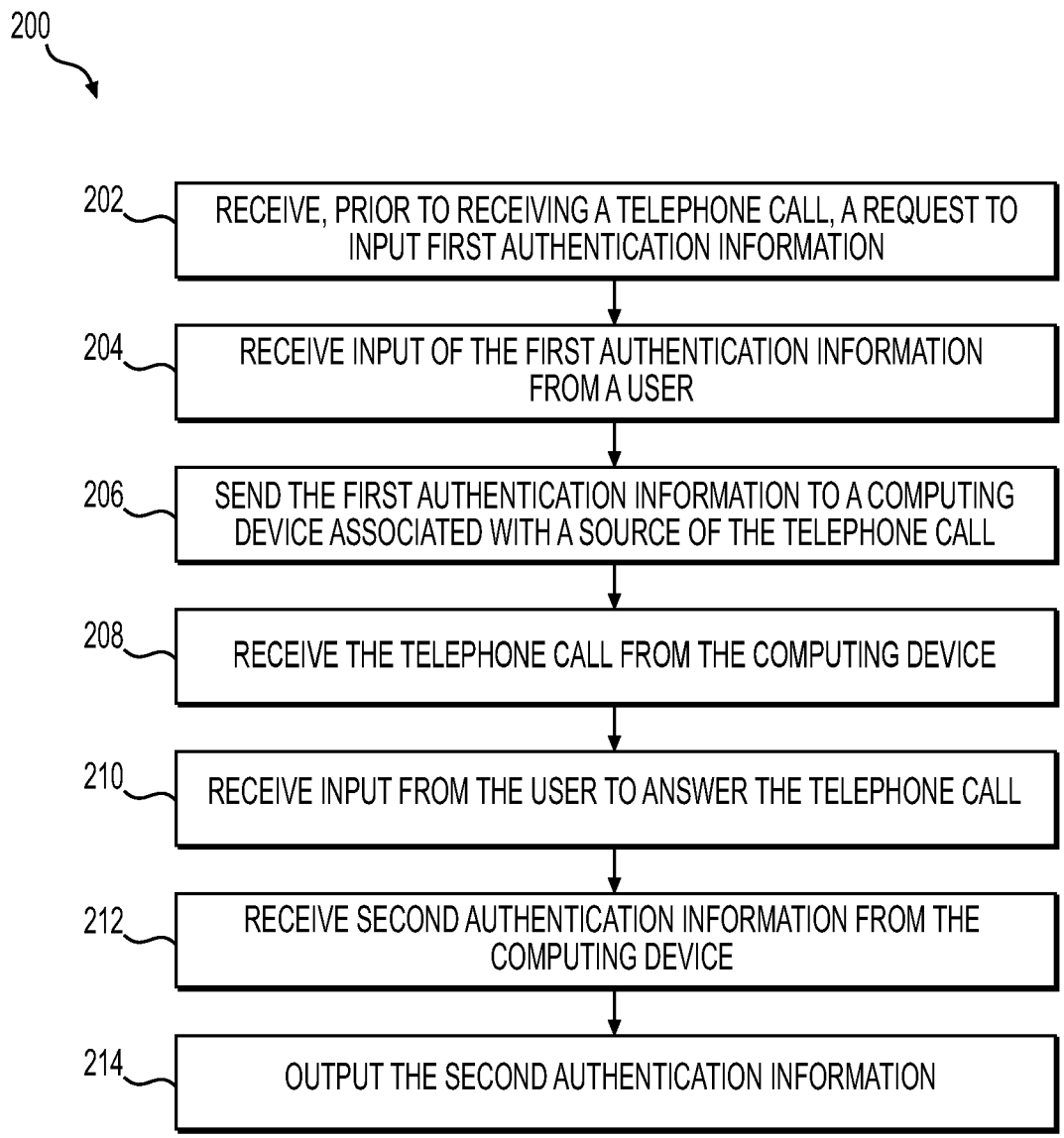
FIG. 2 depicts a flowchart of an exemplary method of using user-generated authentication information to detect and/or prevent vishing attacks, according to one or more embodiments.

FIG. 2 depicts a flowchart of an exemplary method 200 of using user-generated authentication information to prevent and/or detect vishing attacks, according to one or more embodiments. In some embodiments, the method 200 may be performed by a user device 102.

At step 202, the method 200 may include receiving, prior to receiving a telephone call, a request to input first authentication information. For example, the user device 102 may receive the request from a server device 104 associated with an organization (e.g., a financial institution). The request may be received via an application installed on the user device 102 and the user device 102 may output the request via an output device of the user device 102. For example, the user device 102 may display a push notification for the request, may output a sound through a speaker of the user device 102, activate a light on the user device 102, and/or the like. The user device 102 may receive the request when the server device 104 adds the telephone call to a queue of planned outbound calls (or when the telephone call is in a certain position in the queue), at a scheduled time, and/or the like, as described in more detail below in connection with FIG. 3.

The first authentication information may include a pin number, a password, a selection of a security question, or the like. In some embodiments, the first authentication information may be information that is not otherwise associated with an account of a user of the user device 102. For example, the request for the first authentication information may include a request for a new and/or temporary pin number to be used just for securing the telephone call and not for other interactions with the institution. This may increase security by reducing or eliminating a need for the user to supply authentication information already associated with an account.

In some embodiments, the user device 102 (or an application installed on the user device 102) may receive the request for first authentication information and the user device 102 or the application may determine a type of first authentication information for the request. For example, the user device 102 or the application may use a machine learning model to determine the type based on a source of the request (e.g., certain sources may be associated with higher security levels than other sources), user preferences (e.g., a user may set higher or lower security preferences through the application), a subject matter of the planned telephone call (e.g., the request may include metadata that indicates a service or topic for which the planned telephone call is associated and certain services or topics may be associated with higher security levels), and/or the like. In this case, the machine learning model may be trained on first training data that includes metadata for the planned telephone call and corresponding security levels and second training data that includes the corresponding security levels and corresponding types of first information to be requested. In this way, the machine learning models may be trained to extract features from a request and classify a telephone call into a security level, and additionally may be trained to select a type of first authentication information for the telephone call based on the security level. The user device 102 or the application may then request input of the first authentication information based on the determined type of first authentication information. For example, the machine learning model may determine that a temporary pin is to be used as the first authentication information, and the application may request that a user of the user device 102 input a temporary pin to be used to authenticate the upcoming telephone call.

The one or more machine learning models may be updated in real-time (or near real-time) based on changes to user preferences, historical activity information related to historical actions by the user (e.g., manual override of a recommended type of first authentication information), and/or the like. In some implementations, the user device 102 (or an application installed on the user device 102) may train the one or more models, or the user device 102 may receive the one or more trained models from a server device 104.

At step 204, the method 200 may further include receiving input of the first authentication information from a user of the user device 102. For example, the user may type, speak, select, or gesture the first authentication information via an input device of the user device 102 (e.g., using a user interface associated with the application). As a specific example, after receiving the request, the user device 102 may display a push notification for the request and the user of the user device 102 may select the push notification to open an application to input the first authentication information via a user interface or the user may input the first authentication information directly via the push notification.

The method 200 may further include, at step 206, sending the first authentication information to a computing device associated with a source of the telephone call. For example, the user device 102 may send the first authentication information from the application to a server device 104 associated with an institution making the telephone call, to another user device 102 (e.g., a desktop computer associated with a customer service representative associated with the institution), and/or the like. The user device 102 may send the first authentication information based on selection of a user interface element (e.g., a button), at a scheduled time after input of the first authentication information, and/or the like.

At step 208, the method 200 may include receiving the telephone call from the computing device. For example, the user device 102 may receive an inbound robotic telephone call from a server device 104, may receive a live telephone call from a customer service representative (e.g., via a user device 102 associated with the representative), and/or the like. At step 210, the method 200 may include receiving input from the user to answer the telephone call. For example, the user device 102 may receive a voice command, a command from a hands-free system, a selection of a user interface element (e.g., a button) displayed on a display of the user device 102, and/or the like to answer the telephone call.

The method 200 may include, at step 212, receiving second authentication information from the computing device and may include, at step 214, outputting the second authentication information. For example, upon answering the telephone call, the user device 102 may receive second authentication information from a server device 104 or a user device 102 associated with a customer service representative. As specific examples, the server device 104 may provide the second authentication information to an application installed on a customer's user device 102 and the application may provide the second authentication information for display in a push notification, the server device 104 may generate artificial voice output through a speaker of the user's user device 102 or another output component, and/or the like. Additionally, or alternatively, the representative may select a user interface element on their user device 102 to cause the application on a customer's user device 102 to display the second authentication information, may speak the second authentication information through a microphone of their user device 102 so that it is output via a speaker of the customer's user device 102, and/or the like.

The second authentication information may include a copy of the first authentication information. For example, the second authentication information may include a pin number input by the user as the first authentication information. Additionally, or alternatively, the second authentication information may be based on the first authentication information. For example, the first authentication information may include a selection of a security question, and the second authentication information may include an answer to the security question. In this way, the provisioning of the second authentication information may authenticate the source of the telephone call to the recipient without needing the recipient to authenticate themselves to the source of the telephone call. This may allow for easy detection and/or preventing of vishing attacks without needing to use computing resource intensive techniques, such as machine learning models, or ineffective techniques, such as blocklists, to detect the vishing calls.

In some embodiments, the user device 102 may receive an input of whether the second authentication information matches the first authentication information. For example, the user of the user device 102 may select a user interface element to indicate whether the second authentication information matches the first authentication information, may receive an input of a voice command indicating whether the second authentication information matches the first authentication information, and/or the like. In some embodiments, the application installed on the user device 102 may verify the second authentication information based on receiving the second authentication information. For example, the application may store a copy of the first authentication information input to the user device 102 and may determine whether the first authentication information and the second information match.

In the event that the user device 102 determines (or receives input) that the first authentication information and the second authentication information match (e.g., that the second authentication information is correct), the user device 102 (or the application installed on the user device 102) may connect the telephone call or provide an indication to the server device 104 or the representative's user device 102 that the information matches. In the event that the user device 102 determines (or receives input) that the first authentication information and the second authentication information do not match (e.g., that the second authentication information is incorrect), then the user may end or terminate the call (e.g., by selecting a user interface element or inputting a voice command to the user device 102), the application may end the call automatically, and/or the like.

In some embodiments, two-way authentication may be performed. For example, either before or after receiving the second authentication information to authenticate the source of the telephone call, the user device 102 may receive a request to input third authentication information (e.g., after answering the telephone call), such as an account pin, an account number, a password, a unique identifier for the recipient, or a biometric input (e.g., a fingerprint scan, etc.) to authenticate the recipient of the telephone call to the source of the telephone call. This may provide two-way verification of the source and recipient of a telephone call.

Accordingly, certain embodiments may generate authentication information for preventing and/or detecting vishing calls. The method 200 described above is provided merely as an example, and may include additional, fewer, different, or differently arranged steps than depicted in FIG. 2.

Figure 3:
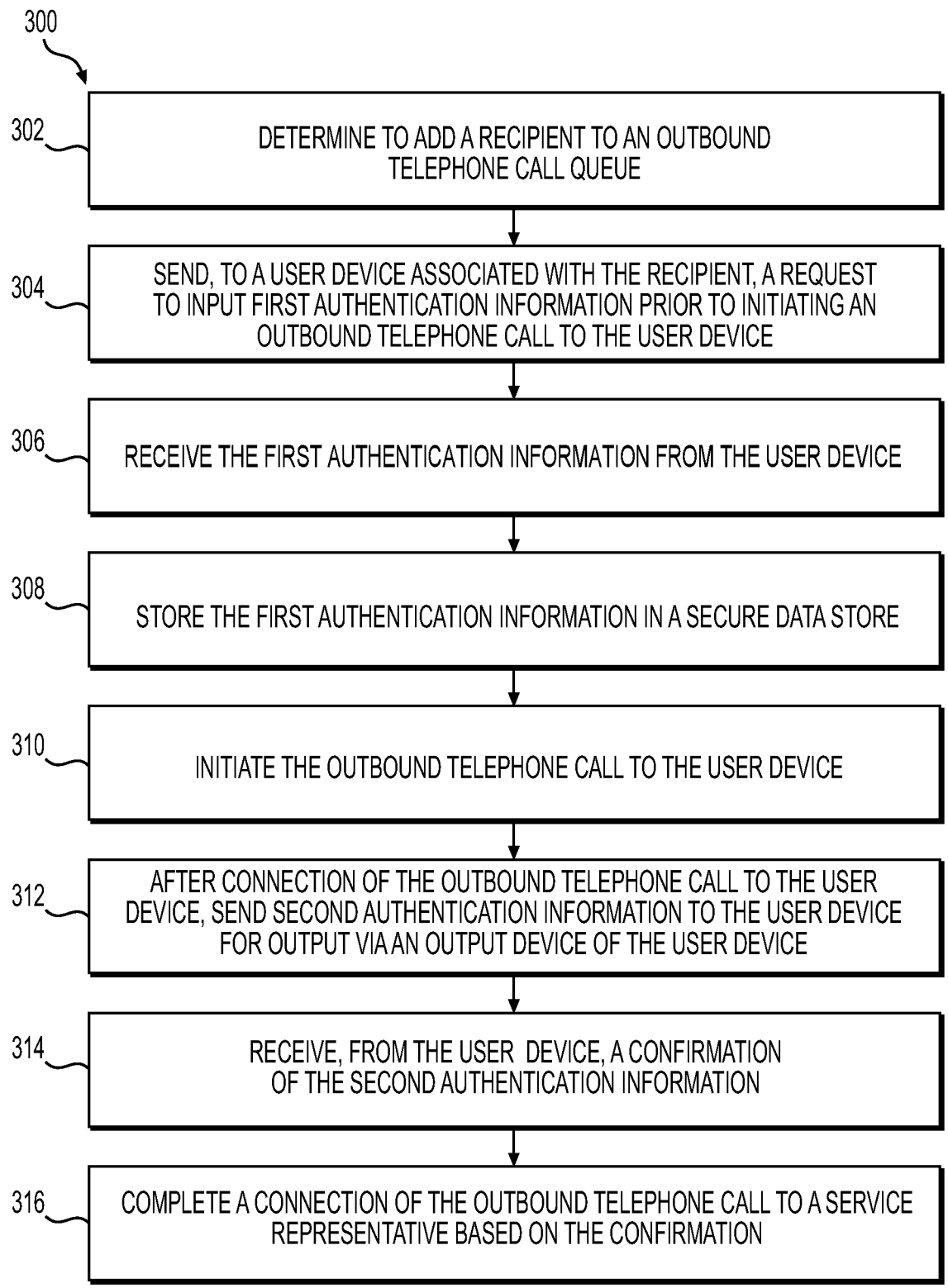
FIG. 3 depicts a flowchart of another exemplary method of using user-generated authentication information to detect and/or prevent vishing attacks, according to one or more embodiments.

FIG. 3 depicts a flowchart of an exemplary method 300 of using user-generated authentication information to detect and/or prevent vishing attacks, according to one or more embodiments. In some embodiments, the method 300 may be performed by a server device 104. At step 302, the method 300 may include determining to add a recipient to an outbound telephone call queue. For example, the server device 104 may determine to add the recipient to the outbound telephone call queue based on receiving an instruction from a user device 102 associated with a customer service representative, at a scheduled time or date (e.g., for regularly scheduled account maintenance), based on an event occurring with respect to an account, and/or the like. The outbound telephone call queue may include a list of recipients of outbound telephone calls to be made from one entity to another entity (e.g., from a company to a customer of the company). The server device 104 may host the outbound telephone call queue in memory of the server device 104 and may make the queue available to one or more other server devices 104, to one or more user devices 102 (e.g., associated with customer service representatives), and/or the like. The server device 104 may assign the next telephone call in the queue to a customer service representative based on the representative being available to make the call, based on a request from a user device 102 of the representative to assign a telephone call to the representative, and/or the like.

At step 304, the method 300 may include sending, to a user device associated with the recipient, a request to input first authentication information prior to initiating an outbound telephone call to the user device. For example, the server device 104 may send the request to a user device 102 (or an application installed on the user device 102) based on adding the telephone call to the outbound telephone call queue, based on the telephone call reaching a certain position in the outbound telephone call queue, based on the telephone call being assigned to a service representative, and/or the like. As described elsewhere herein, the server device 104 may send a push notification to the user device 102, may populate a message inbox associated with the recipient with a message, and/or the like to send the request. The request and the first authentication information may be similar to that described elsewhere herein.

In some embodiments, prior to sending the request, the server device 104 may determine a type of first authentication information for the request. For example, the server device 104 may use one or more trained machine learning models to determine the type of first authentication information based on security preferences of the recipient, a subject matter of the telephone call, the source of the telephone call, and/or the like. The one or more machine learning models may be trained in a manner similar to that described above in connection with the method 200.

The method 300 may include, at step 306, receiving the first authentication information from the user device. For example, the server device 104 may receive the first authentication information from the user device 102 (or an application installed on the user device 102) associated with the recipient when the recipient inputs the first information to the user device 102, at a scheduled time prior to a predicted time for the telephone call, based on sending an instruction to the user device 102 to provide the first authentication information (e.g., an instruction that indicates that the outbound telephone call has reached a certain position in the outbound call queue), and/or the like.

At step 308, the method 300 may include storing the first authentication information in a secure data store. For example, the server device 104 may store the first authentication information in the data store. The data store may include a secure storage where contents of the data store are encrypted (e.g., where the contents are transformed into cipher text). The server device 104 may make the contents of the data store available to user devices 102 (e.g., associated with service representatives) and/or other server devices 104 upon request and/or authentication to the server device 104.

The method 300 may include, at step 310, initiating the outbound telephone call to the user device. For example, the server device 104 may initiate the outbound telephone call to the user device 102 associated with the recipient. In some embodiments, a user device 102 may initiate the outbound telephone call to the user device 102 associated with the recipient.

Initiating the outbound telephone call may include dialing a telephone number for the recipient's user device 102. For example, the server device 104 (or a user device 102) may use a robotic dialer to dial the telephone number or a user of a user device 102 may dial the number using a dial pad user interface. The server device 104 may automatically dial the telephone number once the outbound telephone call has reached the top of the queue and has been assigned to a service representative or may wait for a command from the user device 102 before dialing the telephone number, in some embodiments.

After connection of the outbound telephone call to the user device, the method 300 may include, at step 312, sending second authentication information to the user device for output via an output device of the user device. For example, the server device 104 may provide the second authentication information to an application installed on the user device 102 for display via the application or a push notification, may provide audio signals to the user device 102 for output via a speaker of the user device 102, and/or the like.

Prior to sending the second authentication information, the server device 104 may determine the second authentication information. For example, the server device 104 may perform a lookup of information associated with the recipient in the data store to identify the first authentication information and may use the first authentication information as the second authentication information, may lookup account-related information to use as the second authentication information (e.g., if the first authentication information includes a security question selected by the recipient then the server device 104 may lookup an answer to the security question where the answer is to be used as the second authentication information), and/or the like.

The method 300 may include, at 314, receiving, from the user device, a confirmation of the second authentication information. For example, the server device 104 may receive, from the user device 102 associated with the recipient, a confirmation of the second authentication information. The confirmation may include voice input to a microphone of the user device 102, selection of a user interface element on a user interface displayed via the user device 102, information in a message from the application installed on the user device 102, and/or the like.

At step 316, the method 300 may include completing a connection of the outbound telephone call to a service representative based on the confirmation. For example, the server device 104 may connect the user device 102 of the recipient with a user device 102 of a service representative (e.g., with a computer of the service representative, with a headset of the service representative, and/or the like). In some embodiments, when a user device 102 associated with a service representative initiates the outbound telephone call, the step 316 may include turning on the service representative's headset, unmuting a microphone for the service representative, turning on an earpiece for the service representative, and/or the like.

At the conclusion of the telephone call, either the recipient or the server device 104 may terminate the connection. After termination of the telephone call, the server device 104 may store information related to the telephone call in a data store. For example, the server device 104 may store information related to a duration of the telephone call, a type of first authentication information and second authentication information used in connection with the telephone call, a service associated with the telephone call, a service representative that completed the telephone call, and/or the like. The server device 104 may use this information to update one or more of the machine learning models described above.

Accordingly, certain embodiments may generate authentication information for detecting and/or preventing vishing attacks. The method 300 described above is provided merely as an example, and may include additional, fewer, different, or differently arranged steps than depicted in FIG. 3.

Figure 4A:
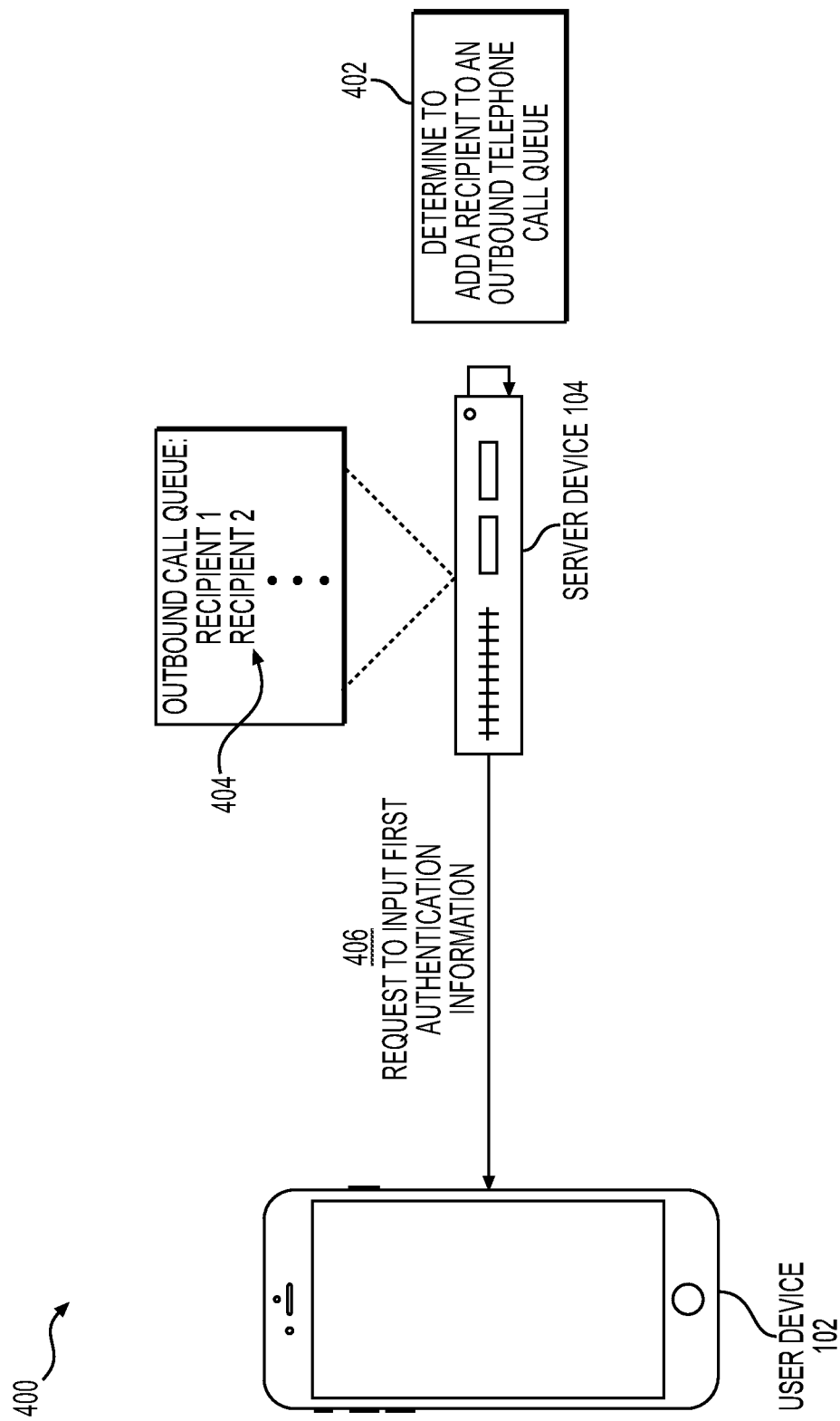
FIGS. 4A-4E depict an example of using an application installed on a user device to generate authentication information to detect and/or prevent vishing attacks, according to one or more embodiments.

FIGS. 4A-4E depict an example 400 of using an application installed on a user device to generate authentication information to detect and/or prevent vishing attacks, according to one or more embodiments. As illustrated in FIG. 4A, the example 400 may include a user device 102 and a server device 104.

As illustrated at 402, the server device 402 may determine to add a recipient to an outbound telephone call queue, e.g., in a manner similar to that described above with respect to step 302 of FIG. 3. For example, as illustrated at 404, the outbound call queue may include various recipients (e.g., "recipient 1," "recipient 2," etc.). Each recipient may be associated with a respective user device 102.

As illustrated at 406, the server device 104 may send, and the user device 102 of a recipient may receive, a request to input first authentication information, e.g., in a manner similar to that described above with respect to steps 202 of FIG. 2 and 304 of FIG. 3. For example, the request may be for input of a pin number, a passcode, selection of a security question, and/or the like.

Figure 4B:
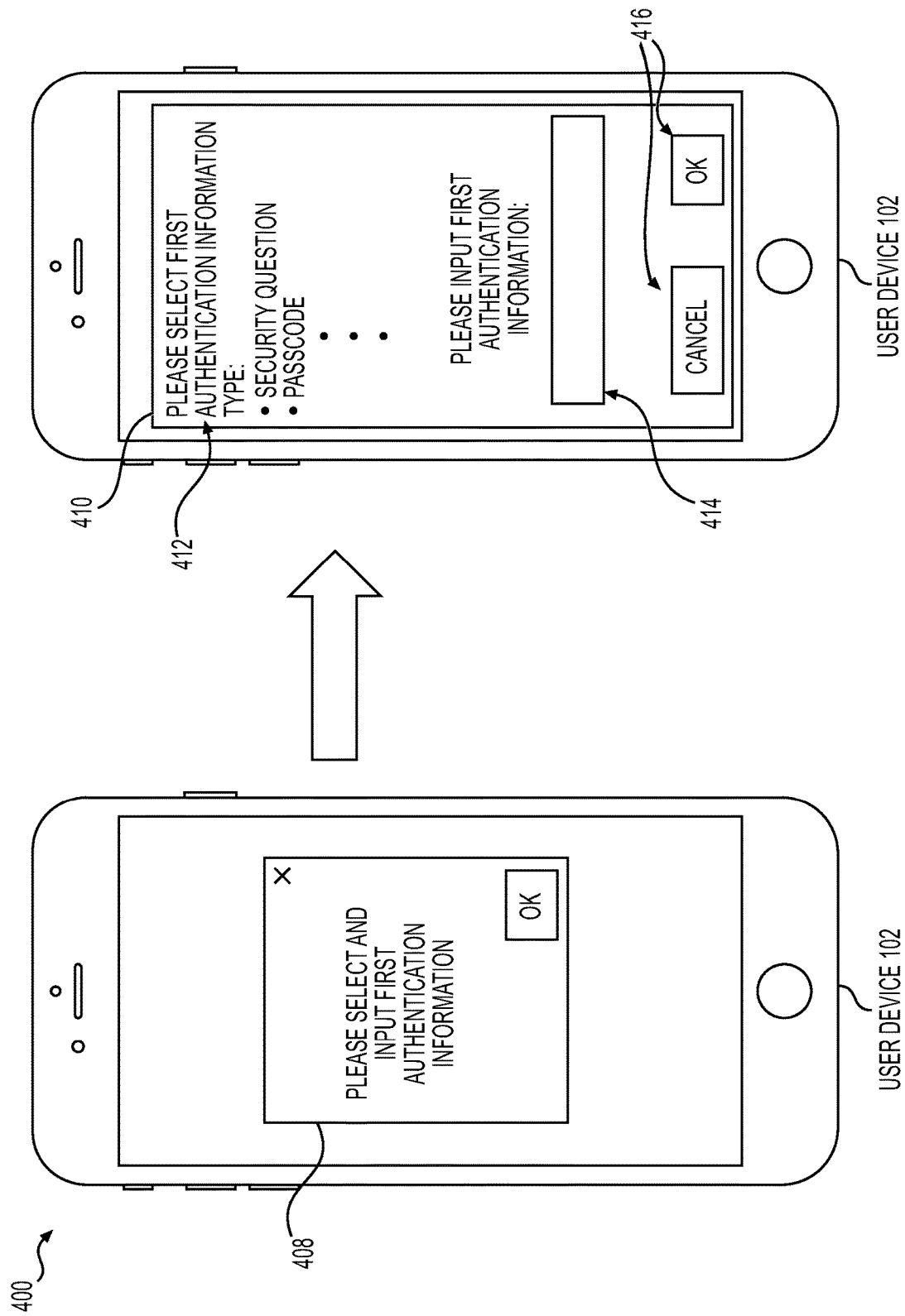

Turning to FIG. 4B, and as illustrated at 408, the user device 102 may display a push notification. The push notification may include the request for input of the first authentication information. As illustrated at 410, the user device 102 may display a user interface for selecting a type of first authentication information and inputting the first authentication information. For example, as illustrated at 412, the user interface may provide various types of first authentication information that the user of the user device 102 may select. The user interface may provide various user interface elements (e.g., buttons, radio buttons, a drop down menu, etc.) for selecting the type of first authentication information. As illustrated at 414, the user interface may provide one or more other user interface elements for input of the particular values for the first authentication information. For example, FIG. 4B illustrates a text box which the user of the user device 102 may populate with a passcode, a pin number, and/or the like.

As illustrated at 416, the user interface may provide one or more other user interface elements for controlling further actions. For example, selection of the "OK" button may cause the application installed on the user device 102 to submit the first authentication information to the server device 104, and selection of the "CANCEL" button may cause the application to stop operations related to responding to the request for the first authentication information.

Figure 4C:
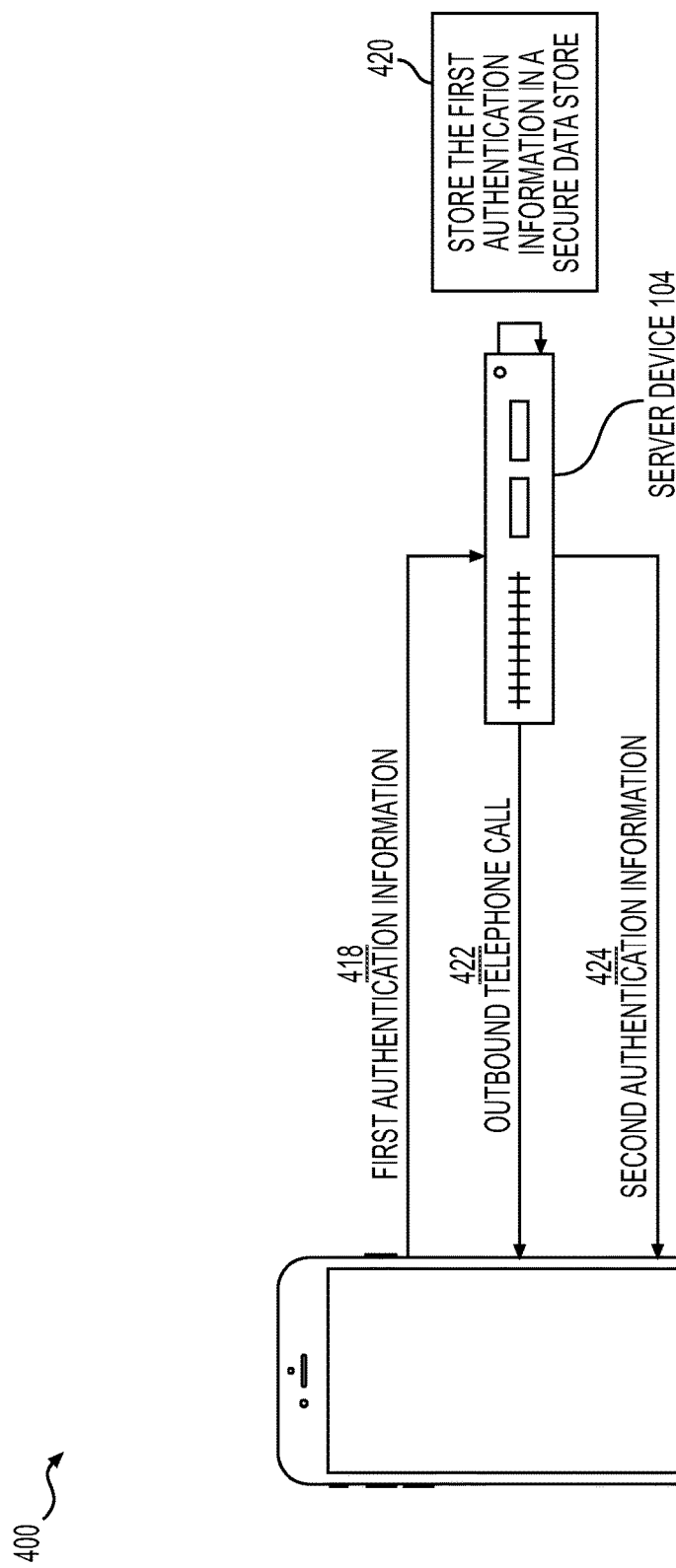

Turning to FIG. 4C, and as illustrated at 418, the user device 102 may send, and the server device 104 may receive, the first authentication information, e.g., in a manner similar to that described with respect to steps 206 of FIG. 2 and 306 of FIG. 3. For example, the user device 102 may send the first authentication information based on a user of the user device 102 selecting the "OK" button illustrated at 416 of FIG. 4B. As illustrated at 420, the server device 104 may store the first authentication information in a secure data store, e.g., in a manner similar to that described at step 308 of FIG. 3.

As illustrated at 422, the server device 104 may initiate the outbound telephone call to the user device 102, e.g., in a manner similar to that at steps 208 of FIGS. 2 and/or 310 of FIG. 3. As illustrated at 424, after initiating the outbound telephone call, and prior to connecting the telephone call to a service representative, the server device 104 may send the second authentication information to the user device 102, e.g., in a manner similar to that at steps 212 of FIG. 2 and 312 of FIG. 3. For example, the server device 104 may send the second authentication information after the user of the user device 102 answers the telephone call but prior to connecting a service representative's user device 102 to the call recipient's user device 102.

Figure 4D:
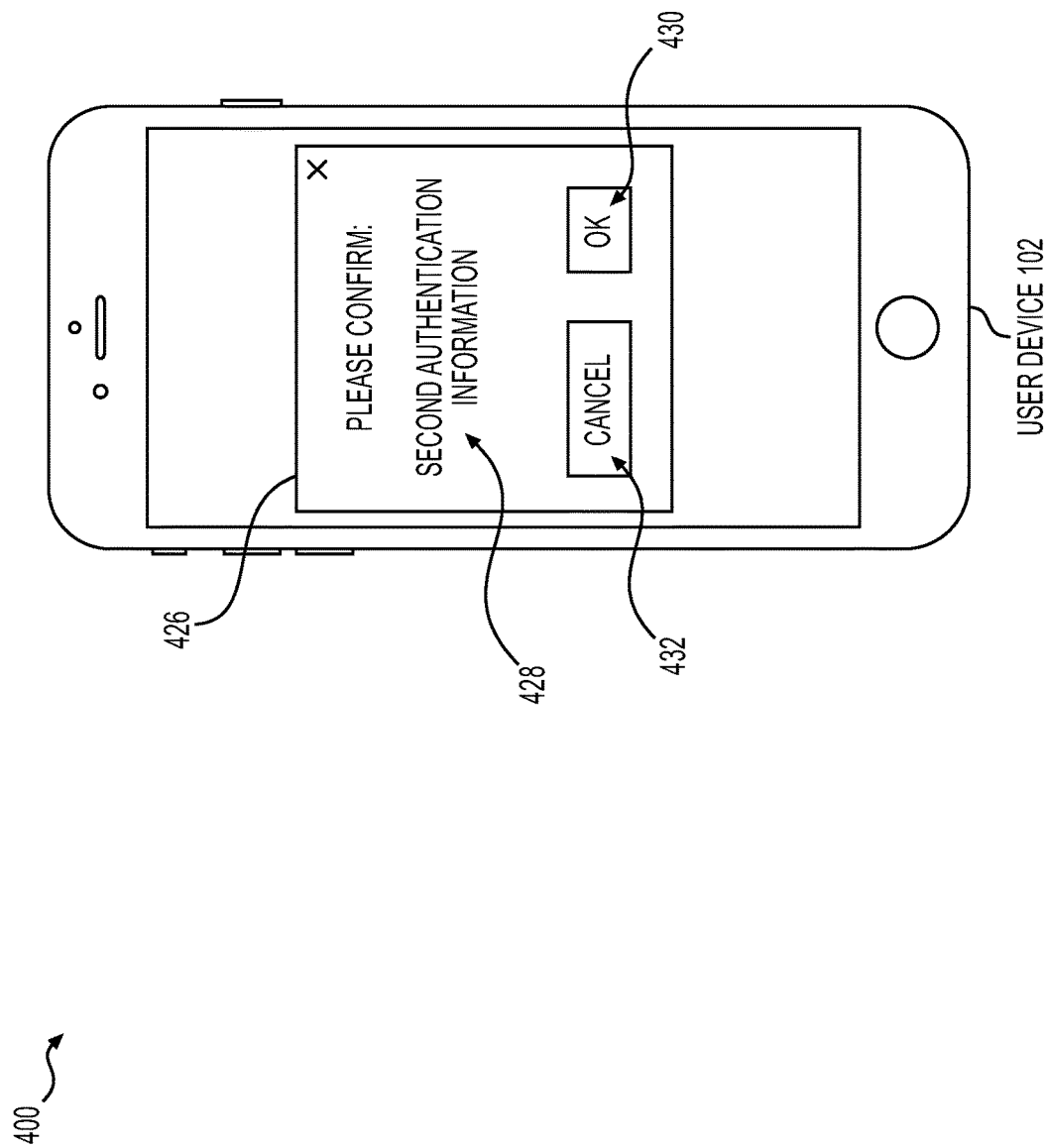

Turning to FIG. 4D, and as illustrated at 426, the user device 102 may provide a user interface for display based on receiving the second authentication information. For example, the user interface may, as illustrated at 428, display the second authentication information and may request that the user confirm the second authentication information. As illustrated at 430 and 432, the user interface may include various user interface elements for controlling confirmation of the second authentication information. For example, the "OK" button may submit confirmation to the server device 104 that the second authentication information is accurate and the "CANCEL" button may submit an indication to the server device 104 that the second authentication information is not confirmed. In some embodiments, and as described elsewhere herein, the request for confirmation may include outputting the second authentication information using artificial voice and confirmation may be provided by the user of the user device 102 verbally or using a keypad of the user device 102.

Figure 4E:
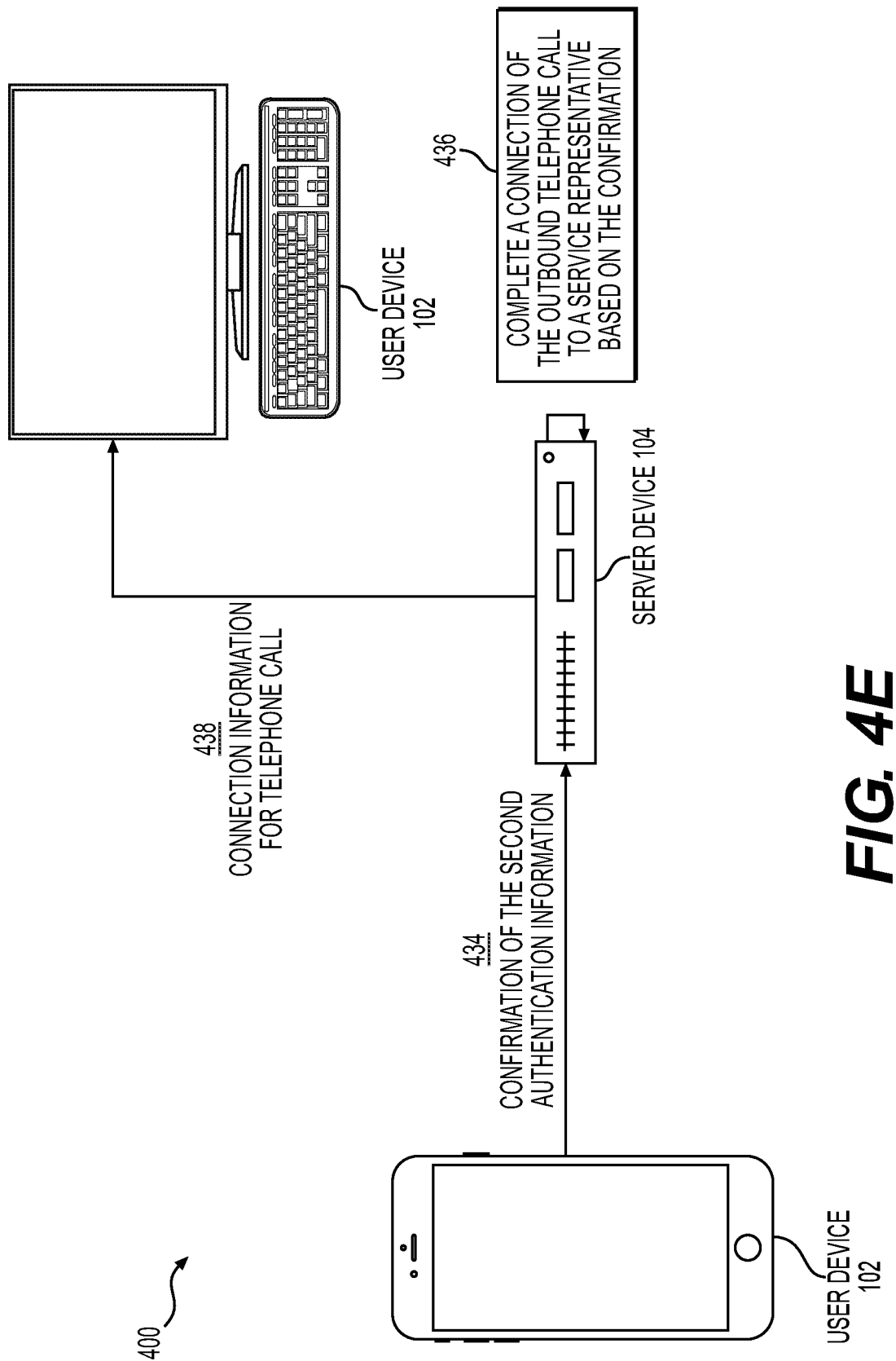

Turning to FIG. 4E, the user device 102 may, as illustrated at 434, provide confirmation of the second authentication information to the user device 102, e.g., as described above with respect to step 314 of FIG. 3. For example, the user device 102 may provide the confirmation based on the user selecting the "OK" button illustrated at 430 of FIG. 4D. As illustrated at 436, the server device 104 may complete a connection of the outbound telephone call to a service representative based on the confirmation, e.g., in a manner similar to that described with respect to step 316 of FIG. 3. For example, the server device 104 may, as illustrated at 438, provide connection information for the telephone call to a service representative's user device 102 to connect the service representative's user device 102 to the call recipient's user device 102. In some embodiments, completing the connection at 438 may include activating the service representative's headset, opening communication pathways between the service representative's user device 102 and the recipient's user device 102 (e.g., by allowing the two user devices 102 to communicate with each other), and/or the like.

The example 400 described above is provided merely as an example, and may include additional, fewer, different, or differently arranged aspects than depicted in FIGS. 4A-4E.

Figure 5:
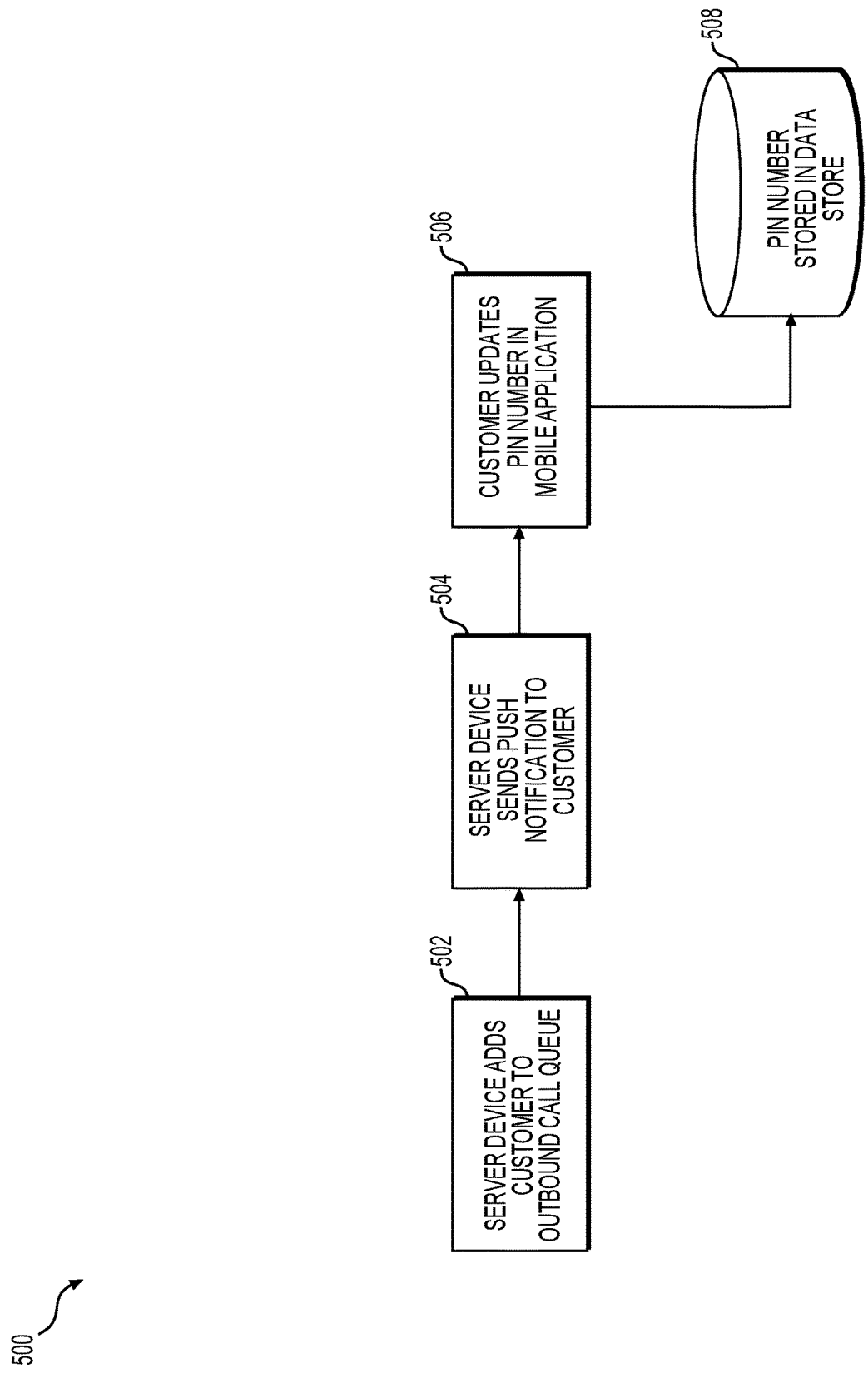
FIG. 5 depicts an example of adding a customer to an outbound call queue, according to one or more embodiments.

FIG. 5 depicts an example 500 of adding a customer (or another entity) to an outbound call queue, according to one or more embodiments. The operations illustrated in FIG. 500 may be performed by a server device 104 associated with a source of a telephone call to the customer.

As illustrated at 502, the server device 104 may add the customer to the outbound call queue, e.g., in a manner similar to that described above in connection with step 302 of FIG. 3. As illustrated at 504, the server device 104 may send a push notification to a user device 102 associated with the customer based on adding the customer to the outbound call queue. For example, the push notification may include a request for input of first authentication information, similar to that described elsewhere herein. As illustrated at 506, the customer may use a user device 102 to update a pin number in a mobile application installed on the user device 102. For example, the pin number may be the first authentication information. As illustrated at 508, the pin number may be provided to the server device 104 and stored in a data store, e.g., in a manner similar to that described above with respect to step 308 of FIG. 3.

The example 500 described above is provided merely as an example, and may include additional, fewer, different, or differently arranged aspects than depicted in FIG. 5.

Figure 6:
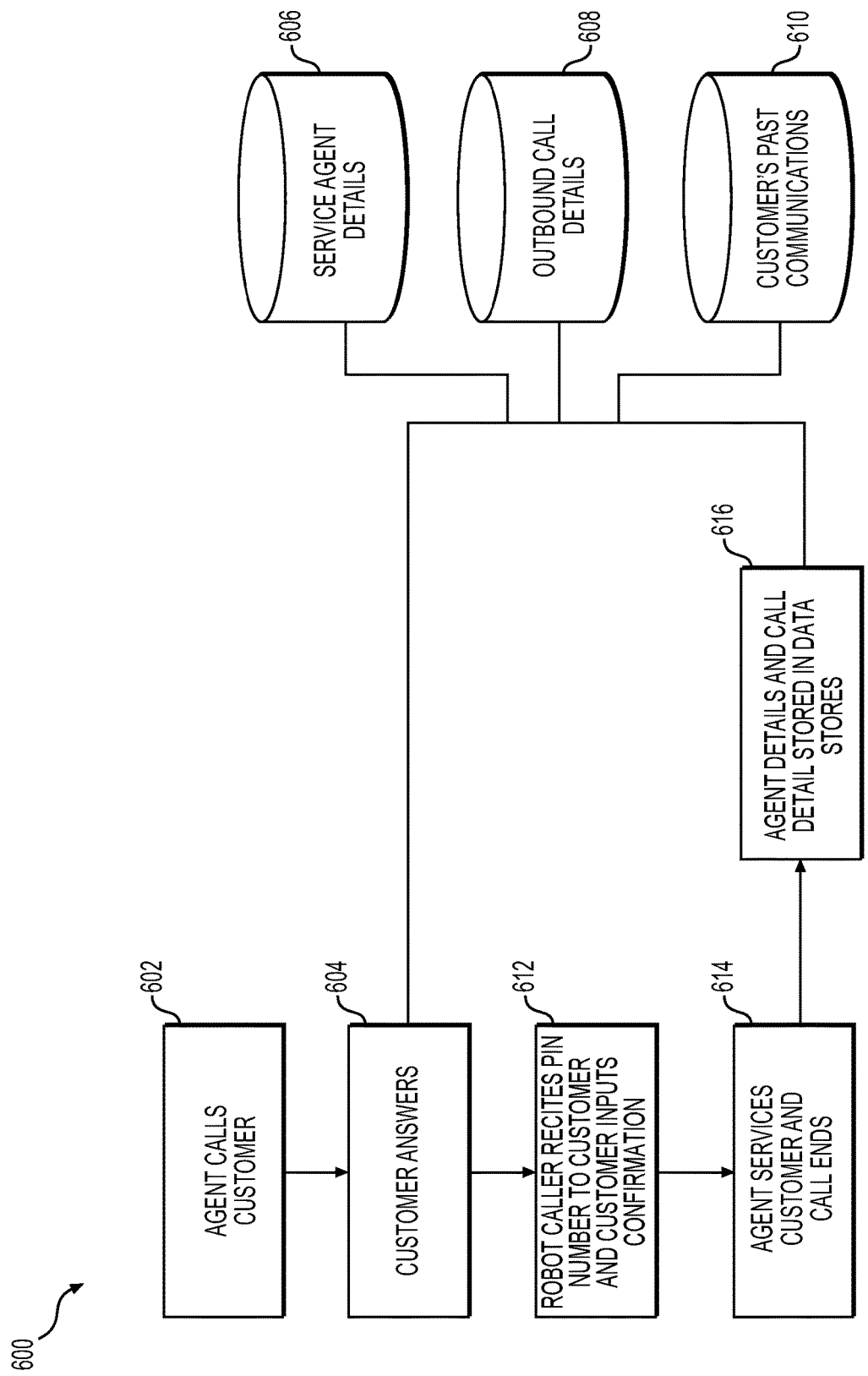
FIG. 6 depicts an example of completing an outbound call, according to one or more embodiments.

FIG. 6 depicts an example 600 of completing the outbound call, according to one or more embodiments. The operations illustrated in FIG. 600 may be performed by a server device 104 associated with a source of a telephone call to the customer and may be performed after the operations of the example 500.

As illustrated at 602, an agent (or service representative, etc.) may call the customer. For example, the agent may use a user device 102 to call a user device 102 associated with the customer. As illustrated at 604, the customer may answer the telephone call. As illustrated at 606, 608, and 610, information from various data stores may be provided to the customer's user device 102 in connection with the call. For example, the server device 104 may provide service agent details (e.g., name, office location, position, employee identifier, etc.), outbound call details (e.g., service with which the telephone call is associated, source of the telephone call, etc.), and information related to the customer's past communications (e.g., whether the telephone call is in response to a customer support request sent to the source of the call, whether the telephone call is a follow-up to other communications from the source of the call, etc.). The server device 104 may provide this information via an application installed on the user device 102 and/or may provide artificial voice output that includes this information.

As illustrated at 612, a robot caller installed on the server device 104 may recite the pin number to the customer. For example, the server device 104 may use artificial voice output to recite the pin number to the customer. As further illustrated at 612, the customer may input confirmation that the pin number is correct. After the server device 104 receives the confirmation, the agent may, at 614, service the customer and the call may end at the conclusion of the telephone call. As illustrated at 616, the server device 104 may store the agent details and call details to the data stores. For example, the server device 104 may store agent details (e.g., name, office location, position, employee identifier, etc.) in the data store illustrated at 606 and may store call details (e.g., call duration, call topic, whether an issue was resolved through the call, etc.) in the data store illustrated at 610. In some embodiments, the server device 104 may use the details of the customer's past communications to update one or more machine learning models described herein.

The example 600 described above is provided merely as an example, and may include additional, fewer, different, or differently arranged aspects than depicted in FIG. 6.

In this way, certain embodiments may facilitate confirmation of an authenticity of a telephone call from a service provider to an individual, such as a customer. For example, by having the individual generate unique authentication information to be provided from the service provider back to the individual, certain embodiments may verify an authenticity of a source of the telephone call to the individual, which may improve security of the telephone call. In addition, by facilitating generation of unique authentication information on an as-needed basis for telephone calls, certain embodiments may reduce or eliminate the need for the exchange of other more persistent account-related information, such as a username and password, a personal identification number for a financial account, and/or the like, which may improve security of an account. By improving security as described herein, certain embodiments may conserve computing resources that would otherwise be consumed as a result of a security breach, such as resources needed to change compromised security credentials, resources needed to eliminate the security breach, and/or the like.

Figure 7:
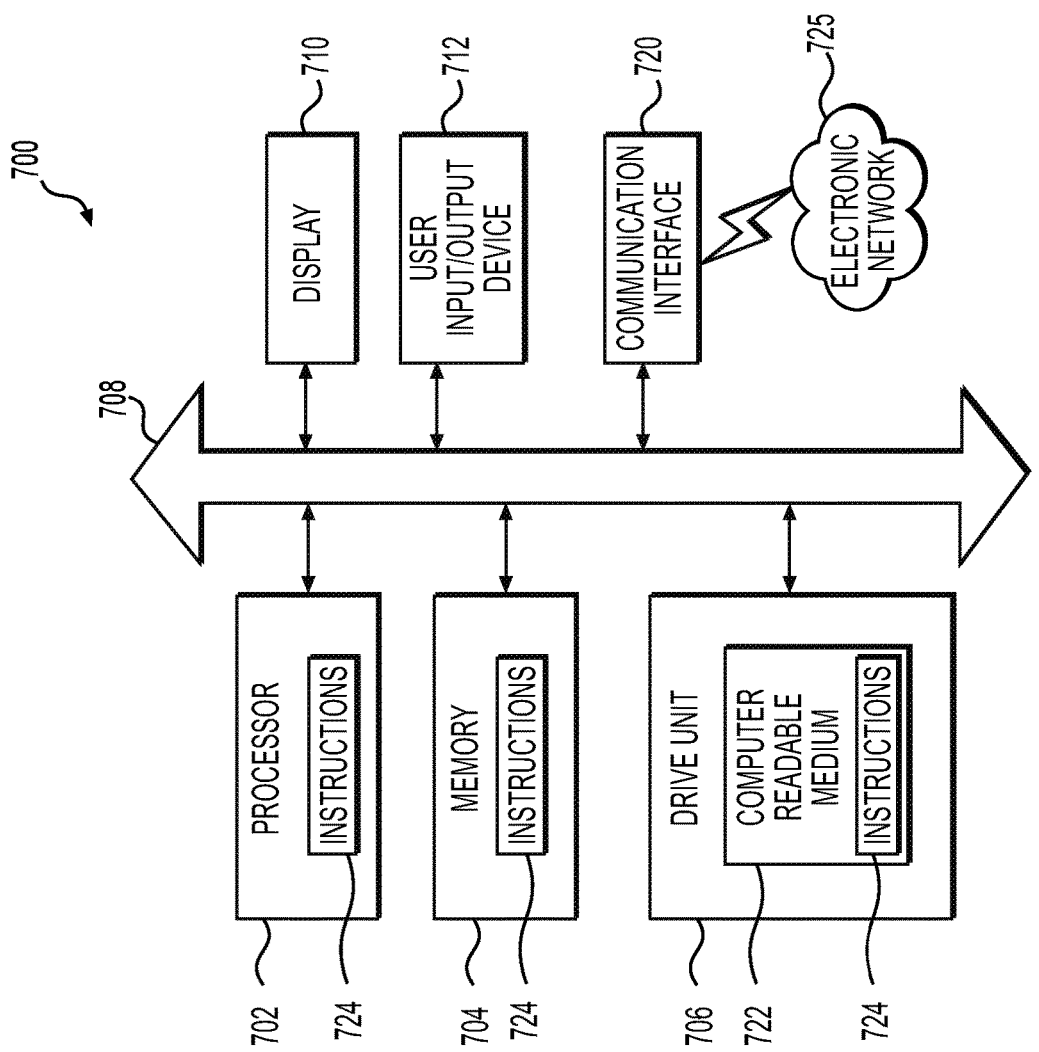
FIG. 7 depicts an example of a computing device, according to one or more embodiments.

FIG. 7 depicts an example of a computer 700, according to certain embodiments. FIG. 7 is a simplified functional block diagram of a computer 700 that may be configured as a device for executing processes or operations depicted in, or described with respect to, FIGS. 2-6, according to exemplary embodiments of the present disclosure. For example, the computer 700 may be configured as the user device 102, server device 104, and/or another device according to exemplary embodiments of this disclosure. In various embodiments, any of the systems herein may be a computer 700 including, e.g., a data communication interface 720 for packet data communication. The computer 700 may communicate with one or more other computers 700 using the electronic network 725. The network interfaces 114A, B in FIG. 1 may include one or more communication interfaces 720. The electronic network 725 may include a wired or wireless network similar to the network 106 depicted in FIG. 1.

The computer 700 also may include a central processing unit ("CPU"), in the form of one or more processors 702, for executing program instructions 724. The processors 110A, B depicted in FIG. 1 may include one or more processors 702. The computer 700 may include an internal communication bus 708, and a drive unit 706 (such as read-only memory (ROM), hard disk drive (HDD), solid-state disk drive (SDD), etc.) that may store data on a computer readable medium 722, although the computer 700 may receive programming and data via network communications. The computer 700 may also have a memory 704 (such as random access memory (RAM)) storing instructions 724 for executing techniques presented herein, although the instructions 724 may be stored temporarily or permanently within other modules of computer 700 (e.g., processor 702 and/or computer readable medium 722). The memories 112A, B depicted in FIG. 1 may include one or more memories 704. The computer 700 also may include user input and output ports 712 and/or a display 710 to connect with input and output devices such as keyboards, mice, touchscreens, monitors, displays, etc. The displays 108A, B may include one or more displays 710. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another, e.g., from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to using user-generated authentication information to detect or prevent vishing calls, any suitable activity may be used. In an exemplary embodiment, instead of or in addition to using the user-generated authentication information to detect or prevent vishing calls, certain embodiments may include training and/or using one or more machine learning models to classify a user or a telephone call into a security level and determine a type of authentication information for a user to generate.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for authenticating a source of a telephone call to a recipient of the telephone call, comprising:
    receiving, by a user device associated with the recipient of the telephone call and prior to receiving the telephone call, a request to input first authentication information, wherein the first authentication information comprises a passcode or a selection of a security question;
    receiving, by the user device, input of the first authentication information;
    sending, by the user device, the first authentication information to a computing device associated with the source of the telephone call;
    receiving, by the user device, the telephone call from the source;
    receiving, by the user device, input from the recipient of the telephone call to answer the telephone call;
    receiving, by the user device, second authentication information from the computing device,
        wherein the second authentication information comprises the passcode or an answer to the security question; and
    outputting, by the user device, the second authentication information.

2. The computer-implemented method of claim 1, wherein the receiving of the input of the first authentication information further comprises:
    receiving the input of the first authentication information via at least one of:
        an input device of the user device, or
        an application installed on the user device.

3. The computer-implemented method of claim 1, further comprising:
    outputting the request via an application installed on the user device as a push notification after receiving the request.

4. The computer-implemented method of claim 1, wherein the outputting of the second authentication information further comprises:
    outputting the second authentication information via at least one of:
        an output component of the user device, or
        an application installed on the user device as a push notification.

5. The computer-implemented method of claim 1, further comprising:
    requesting, via an application installed on the user device and prior to receiving the second authentication information, input of third authentication information from the recipient of the telephone call after answering the telephone call, wherein the third authentication information comprises at least one of:
        a password,
        a unique identifier for the recipient, or
        a biometric input.

6. The computer-implemented method of claim 1, further comprising:
    receiving, by an application installed on the user device, information related to a subject matter of the telephone call prior to receiving the request to input the first authentication information; and
    determining, by the application, the first authentication information to be requested based on a security preference set in the application.

7. The computer-implemented method of claim 1, wherein the request further comprises information related to the source of the telephone call.

8. The computer-implemented method of claim 7, wherein the second authentication information comprises the information related to the source of the telephone call.

9. The computer-implemented method of claim 1, wherein the first authentication information is based on historical activity information related to the recipient of the telephone call.

10. The computer-implemented method of claim 1, further comprising:
    receiving input that the second authentication information is correct via at least one of:
        an input device of the user device, or
        an application installed on the user device; and
    providing the input that the second authentication information is correct to the computing device associated with the source of the telephone call.

11. The computer-implemented method of claim 1, further comprising:
    receiving input that the second authentication information is incorrect via at least one of:
        an input device of the user device, or
        an application installed on the user device; and
    terminating the telephone call based on the input that the second authentication information is incorrect.

12. A user device, comprising:
    at least one memory storing instructions; and
    at least one processor executing the instructions to perform operations for authenticating a source of a telephone call to a recipient of the telephone call, the operations including:
        receiving, prior to receiving the telephone call, a request to input first authentication information,
            wherein the first authentication information comprises a passcode or a selection of a security question;
        receiving input of the first authentication information;
        sending the first authentication information to a computing device associated with the source of the telephone call;
        receiving the telephone call from the source;
        receiving input from the recipient of the telephone call to answer the telephone call;
        receiving second authentication information from the computing device, wherein the second authentication information comprises the passcode or an answer to the security question; and outputting, by the user device, the second authentication information.

13. The user device of claim 12, wherein the receiving of the input of the first authentication information further comprises:

receiving the input of the first authentication information via at least one of:
an input device of the user device, or
an application installed on the user device.

14. The user device of claim 12, wherein the operations further comprise:

outputting the request via an application installed on the user device as a push notification after receiving the request.

15. The user device of claim 12, wherein the outputting of the second authentication information further comprises:

outputting the second authentication information via at least one of:
an output component of the user device, or
an application installed on the user device as a push notification.

16. The user device of claim 12, wherein the operations further comprise:

requesting, via an application installed on the user device and prior to receiving the second authentication information, input of third authentication information from the recipient of the telephone call after answering the telephone call, wherein the third authentication information comprises at least one of:
a password,
a unique identifier for the recipient, or
a biometric input.

17. The user device of claim 12, wherein the operations further comprise:

receiving, by an application installed on the user device, information related to a subject matter of the telephone call prior to receiving the request to input the first authentication information; and determining, by the application, the first authentication information to be requested based on a security preference set in the application.

18. The user device of claim 12, wherein the request further comprises information related to the source of the telephone call.

19. The user device of claim 12, wherein the first authentication information is based on historical activity information related to the recipient of the telephone call.

20. A non-transitory computer-readable medium storing instructions that, when executed by a processor, cause the processor to perform a method for authenticating a source of a telephone call to a recipient of the telephone call, the method comprising:

receiving, prior to receiving the telephone call, a request to input first authentication information,
wherein the first authentication information comprises a passcode or a selection of a security question;
receiving input of the first authentication information;
sending the first authentication information to a computing device associated with the source of the telephone call;
receiving the telephone call from the source;
receiving input from the recipient of the telephone call to answer the telephone call;
receiving second authentication information from the computing device,
wherein the second authentication information comprises the passcode or an answer to the security question; and
outputting the second authentication information.

\* \* \* \* \*